Patented June 2, 1953

2,640,780

UNITED STATES PATENT OFFICE 2,640,780

ANTISPATTERING MARGARIN

Morris Mattikow, New York, N. Y., assignor to Benjamin Clayton, doing business as Refining, Unincorporated No Drawing. Application November 14, 1949, Serial No. 127,236

5 Claims. (Cl. 99—123)

This invention relates to the preparation of a stable non-spattering margarin, and more particularly, to a margarin containing the alcohol-soluble fraction of oil-free vegetable phosphatides as an anti-spattering and emulsifying agent.

High quality margarin as now produced and sold is very difficult to distinguish from butter when employed for table use such as a spread for bread, since it has substantially the same physical characteristics such as texture, melting point and congeal point and has a flavor and taste substantially identical with that of butter. When commercial margarins are employed for uses involving the melting of the margarin in cooking vessels, for example, as a frying fat, the difference is immediately apparent. That is to say, butter melts with substantially no spattering or separation of the milk solids. Instead a quiescent foam collects on the surface of the melted butter and substantially no settling of milk solids occurs. On the other hand, commercial margarins spatter badly when heated to their melting points or above in a cooking vessel and furthermore, the milk solids settle out and adhere to the heated surface of the vessel. Continued heating causes scorching of the settled milk solids and darkening of the melted fat. This is explained on the basis, that heating of margarin breaks the oil-in-water emulsion of the margarin such that relatively large drops of water form in the heated fat. The explosive escape of steam from these relatively large droplets of water expels fat droplets from the fat and the evaporation of the water from the large droplets leaves agglomerations of milk solids normally in solution in the water which agglomerations settle in the heated fat. At least part of the explanation of why solids separate out of heated margarin and why the heated margarin spatters is therefore believed to be the failure of the emulsifying agent employed in the margarin to maintain the water in small droplets until the water is evaporated during melting of the fat, although there are probably other factors contributing to the effect.

Margarin can be prepared without the employment of any emulsifying agents other than those naturally occurring in the cultured skimmed milk ordinarily employed in producing margarin and such margarin is entirely suitable for immediate table use. Upon standing, however, water separates or "leaks" out of the margarin. Various emulsifying agents have been suggested and a considerable number have been used commercially to prevent such separation of water. At one time, perhaps the most commonly used emulsifying agents for this purpose was commercial soyabean lecithin which is soyabean phosphatides in about 35 to 40% of crude soyabean oil as a carrier. Substantial amounts of soyabean lecithin are still employed in margarin. Soyabean lecithin is not, however, an effective anti-spattering agent.

Other emulsifying agents which have been employed in margarin are synthetic materials known as mono- and diglycerides. The mono- and diglycerides are effective anti-leaking agents but have very little effect in preventing spattering and solids separation. Perhaps the most effective anti-spattering agents employed prior to the present invention are synthetic materials known as sodium sulfoacetate derivatives of mono- and diglycerides. Most of the margarin now sold in this country is believed to contain this material or mixtures thereof with mono- and diglycerides as the emulsifying and anti-spattering agent. The efficacy of these materials for preventing spattering and solids separation leaves much to be desired as can be readily determined by heating any of the highest quality commercial margarins to frying temperatures in a cooking vessel in comparison with butter.

In accordance with the present invention, I have found that the methanol-soluble fraction of oil-free vegetable phosphatides is not only an effective emulsifying agent for preventing leakage of water from the margarin while the margarin is in a semi-solid or plastic condition, but that this material substantially completely eliminates spattering and solids separation when the margarin is heated. The alcohol-soluble fraction above mentioned may be produced from vegetable oil phosphatides such as commercial soyabean oil lecithin or commercial corn oil phosphatides by solvent treatment using any one of several procedures given in detail below. Small amounts of this material may be added in any known or suitable manner to margarin during the manufacture of such margarin by any of several known commercial practices. While the alcohol-soluble fraction of oil-free soyabean oil phosphatides is a more effective anti-spattering agent than previously known agents for this purpose, the alcohol-soluble fraction of oil-free corn oil phosphatides has been found to be an even more effective agent for preventing spattering and solids separation than the similar product derived from soyabean phosphatides.

It is therefore an object of the present invention to provide an improved anti-spattering margarin.

Another object of the present invention is to provide an improved anti-spattering margarin, containing the alcohol-soluble fraction of an oil-free vegetable oil phosphatide as an anti-spattering and emulsifying agent.

Another object of the invention is to provide an improved margarin containing the alcohol-soluble fraction of an oil-free corn oil phosphatide as an anti-spattering and emulsifying agent.

A further object of the present invention is to provide an improved agent for addition to margarin for substantially completely preventing spattering and solids separation when the margarin is melted.

A still further object of the invention is to provide a method for producing an improved anti-spattering and emulsifying agent for incorporation into margarin.

Other objects and advantages will appear in the following detailed description of the invention.

Commercial vegetable lecithins or phosphatides are relatively inexpensive materials available on the market in large quantities. The commercial lecithins or phosphatides are recovered from either soyabean oil or corn oil by precipitation and separation of the phosphatides from crude oils, the precipitation usually being effected by mixing a small amount of water with the oils, for example, about 5% of water. The phosphatides thus precipitated are continuously centrifugally separated from the oil and are then dried at relatively low temperature, i. e., below approximately 140° F., under vacuum conditions. The dried phosphatides are the commercial products and consist of the phosphatides themselves along with minor amounts of a large number of other materials including sterols and sterol glycosides all in a carrier oil. This carrier oil is a crude oil of the same type as the oil originally associated with the phosphatides and usually represents between 30 and 40% of the commercial phosphatide or lecithin. Edible phosphatides in a carrier oil can be recovered in substantially the same manner from other edible oils which contain no toxic materials, for example, peanut oil, and can be employed as a source material in the present invention, but so far as applicant is aware, they are not commercially available at the present time. Cottonseed phosphatides, recovered from cottonseed oil, would also be suitable if completely freed of gossypol, which is a toxic material recovered with the phosphatides of cottonseed oil by the procedure mentioned above. The gossypol can be removed but the difficulties of completely removing gossypol from cottonseed oil phosphatides have thus far prevented their commercial use in edible products.

Both commercial soyabean oil phosphatides and corn oil phosphatides have been commercially employed as an emulsifying agent in margarin. They prevent leakage but do not, however, prevent deleterious spattering and solids separation when the margarin is used for frying or otherwise melted for use in cooking. Either commercial soyabean oil phosphatides or corn oil phosphatides with their associated carrier oil can, however, be treated in accordance with the present invention to produce an emulsifying agent which does substantially completely eliminate spattering and solids separation.

In accordance with the present invention, the commercial phosphatides may be first treated with a solvent so as to substantially completely remove the carrier oil. Acetone is the preferred solvent for this purpose as the carrier oil is substantially completely soluble therein while the phosphatides themselves are insoluble in acetone. The removal of the carrier oil can be effected by merely extracting the phosphatides of commerce with acetone, the extract being separated from the insoluble phosphatides either by filtration or decantation. The carrier oil is not made up of pure glycerides of fatty acids but contains a substantial amount of deleterious impurities which are removed with the carrier oil.

The amounts of acetone are not critical, it merely being sufficient to employ enough acetone that substantially all of the carrier oil is removed. Several extraction steps using fresh acetone in each step is usually more effective than employing a large amount of acetone in a single step. After the acetone extraction step or steps, the acetone in the residual acetone-insoluble phosphatides may be removed by evaporation at atmospheric pressure or under vacuum. Since acetone is extremely volatile, no difficulty is encountered in removing substantially all of the acetone at atmospheric pressure and at relatively low temperatures, i. e., temperatures no higher than 135° F. Instead of acetone, other solvents in which the carrier oil is soluble and the phosphatides are insoluble may be employed, for example, methyl acetate or any of the lower saturated aliphatic ketones, such as methyl ethyl ketone, i. e., those containing up to about 5 carbon atoms, although the employment of solvents having a higher boiling point than acetone will ordinarily require final evaporation of the solvent from phosphatidic material under vacuum conditions in order to avoid subjecting the phosphatidic material to elevated temperatures, i. e., temperatures above approximately 140° F. Such other solvents may be employed alone or various mixtures of such solvents, including admixtures with acetone, may be employed, and in general, produce substantially the same results as the employment of acetone alone. That is to say, the residue can be characterized as the acetone-insoluble or oil-free fraction of the commercial phosphatides.

Alternatively, the commercial phosphatides containing the carrier oil can be first dissolved in a small amount of a solvent for the entire phosphatidic material including the carrier oil, for example, a hydrocarbon solvent such as hexane, petroleum ether or benzol. After separation of any insoluble material, acetone or one of the other solvents or mixtures of solvents mentioned above can then be added to precipitate the phosphatides. This last procedure is advantageous in that it also eliminates any non-phosphatidic material insoluble in the hydrocarbon solvent and also eliminates a small amount of material soluble in the hydrocarbon solvent and not soluble in the acetone or equivalent solvent alone. A treatment of the vegetable oil phosphatides with a hydrocarbon solvent to eliminate impurities insoluble in the hydrocarbon, followed by evaporation of the hydrocarbon solvent from the extract to recover a purified residue of phosphatides dissolved in carrier oil can be employed with any of the various alternative processes described herein but, in general, such treatments are not essential.

The oil-free or acetone-insoluble material obtained as above described may then be extracted with a lower aliphatic alcohol. The preferred alcohol is methanol although ethyl, butyl and propyl alcohols may be employed, i. e., saturated lower aliphatic alcohols containing up to about 4 carbon atoms. Various mixtures of such alcohols may also be employed. Again, the amount of the alcohol or mixtures thereof is not critical, it merely being necessary to employ enough alcohol to extract substantially all of the alcohol-soluble materials. Several extraction steps employing fresh quantities of alcohol are preferable. The extracts of the various extraction steps may be combined and evaporated to dryness, leaving a residue of alcohol-soluble oil-free phosphatides. Evaporation at least in the latter stages is preferably carried out in vacuo at a temperature below about 140° F.

As another alternative, the alcohol-soluble phosphatides may be precipitated from their alcohol solution by the addition of acetone or other similar solvents or mixtures of solvents discussed above. The precipitated alcohol-soluble phosphatides may then be separated from the solvent mixture by decantation or filtration and dried preferably under vacuum conditions as above described.

As a further alternative, the original commercial phosphatidic material with its carrier oil can first be extracted with the alcohol or alcohol mixture to produce an extract containing the alcohol soluble fraction of the phosphatides along with the carrier oil and a residue of alcohol-insoluble phosphatides. After separation of the insoluble residue, acetone or other similar solvent mentioned above can be added to precipitate the alcohol-soluble phosphatides, the carrier oil being soluble in the mixture of solvents. Separation of the precipitated phosphatides from the solvent mixture and evaporation of residual solvent therefrom produces the oil-free alcohol-soluble fraction. It is also possible to evaporate the original alcoholic extract containing both the alcohol-soluble phosphatides and the carrier oil to remove the alcohol or alcohol mixture and then extract the resulting residue with acetone or similar solvent to remove the carrier oil. Evaporation of residual solvent from the resulting residue also produces the oil-free alcohol-soluble phosphatide fraction.

It is preferred to employ the alternatives in which the various solvents are separately used as the solvents are then more easily recovered for re-use in the process, the process in which acetone is first employed to remove the carrier oil and then methanol employed to recover the alcohol-soluble fraction being the preferred process. In any of the above alternatives the results obtained by employing the various alcohols or alcohol mixtures are substantially the same as that obtained by employing methanol so that the product resulting from the solvent treatments above described may be characterized as the methanol-soluble fraction of oil-free vegetable oil phosphatides.

The alcohol-soluble oil-free phosphatides will ordinarily be either a powder or a waxy solid and are completely soluble in glyceride oils and completely dispersible in water. They may be added to the margarin as described below, either in the oil-free form just described or in solutions in a glyceride oil or dispersed in water or in cultured milk. It is preferred to dissolve the oil-free alcohol-soluble phosphatides in a carrier of refined glyceride oil, preferably a refined vegetable oil. Such refined oil may be the liquid oil of the type from which the phosphatides were originally obtained or may be any other edible glyceride oil including vegetable oils hydrogenated to margarin consistency. Even if the refined carrier oil is of the same type as that from which the phosphatides were originally obtained, the resulting product is substantially free from the impurities associated with the original carrier oil. Incorporating the alcohol-soluble phosphatide fraction into a carrier oil, for example, into enough glyceride oil to provide a phosphatide concentration of approximately 20 to 80% and preferably a concentration of 50% alcohol-soluble phosphatides in carrier oil by weight, stabilizes the phosphatides against oxidation and renders them more easily incorporated into the margarin.

As indicated above, the oil-free alcohol-soluble phosphatides may also be dispersed in water but such dispersions are ordinarily subject to bacterial growth unless a preservative such as sodium benzoate is incorporated therein to prevent the growth of molds. A concentrate of alcohol-soluble phosphatides in a carrier of refined oil is therefore the preferred commercial product for sale to margarin manufacturers, although it is entirely possible to furnish either the oil-free alcohol-soluble phosphatides or an aqueous dispersion thereof as the commercial product.

As an example of carrying out the process of preparing the oil-free alcohol-soluble phosphatides, 1000 parts by weight of commercial corn oil phosphatides with their associated corn oil was extracted at approximately 25° C. with acetone until substantially all of the carrier oil was removed. Approximately 3000 parts by weight of acetone were employed in each of three extraction steps. The acetone extracts were separated from the acetone-insoluble phosphatides by filtration after each extraction step and the residual acetone was evaporated from the final residue by gently heating the residue in vacuum. This acetone may be condensed for re-use in the process and the acetone from the acetone extracts may also be recovered for re-use by distillation of the extracts. The particular corn oil phosphatide selected contained approximately 40% carrier oil and the recovery of oil-free corn oil phosphatides in the dried residue was approximately 600 parts by weight.

The dried residue of oil-free phosphatides was then extracted with approximately 2000 parts by weight of methanol at 25° C. and the extraction with this amount of methanol was repeated four times. The extracts were filtered from the residue of alcohol-insoluble phosphatide residue after each extraction and combined. The methanol was then evaporated in vacuo leaving a residue of oil-free alcohol-soluble phosphatides of approximately 250 parts by weight. The residue was a light colored waxy material. It is apparent that the oil-free alcohol-soluble phosphatides represented about 25% of the original commercial corn oil phosphatides and approximately 42% of the oil-free phosphatides. A comparison of the alcohol-soluble fraction of the oil-free corn oil phosphatides with the alcohol-insoluble portion of the same phosphatides is given in the following table:

| | Iodine No. | Percent P | Percent N | Percent Ash | Percent glycosides |
|---|---|---|---|---|---|
| Alcohol-soluble | 75.4 | 3.45 | 1.65 | 4.3 | 6.5 |
| Alcohol-insoluble | 53.5 | 3.45 | 1.42 | 10.1 | 10.7 |

It is to be noted that the alcohol-soluble fraction was lower in ash and glycosides than the alcohol-insoluble portion but was higher in nitrogen and iodine number. The alcohol-soluble portion is also higher in lecithin phosphatides than the alcohol-insoluble fraction but this does not appear to be the sole factor in preventing spattering since the alcohol-soluble fraction of oil-free corn oil phosphatides is a better anti-spattering agent than the corresponding fraction from soyabean oil phosphatides even though the former fraction is lower in lecithin phosphatides than the latter fraction.

In order to provide a stabilized material suitable for incorporation into margarin, the 250 parts by weight of oil-free alcohol-soluble phosphatides were dissolved in an equal quantity of refined corn oil so as to provide a product having approximately 50% by weight concentration of the alcohol-soluble phosphatides. Higher and lower concentrations of the alcohol-soluble phosphatides in an oil or fat may, however, be prepared, for example, concentrations ranging from 20 to 80% although concentrations ranging between 30 and 60% are preferred. The oil or fat may be any liquid or semi-solid edible vegetable or animal oil or fat, for example, it may be a vegetable oil hydrogenated to margarin consistency although it is not necessary that the carrier be of margarin consistency since the amount of the concentrate which is added to margarin is small. Such concentrates are also completely dispersible in water. Aqueous concentrates may be prepared by dispersing in water the oil-free alcohol-soluble phosphatides or the concentrates in oil as above described. Such aqueous concentrates may contain, for example, 10 to 60% phosphatidic material, although as noted above, a preservative will ordinarily have to be employed to prevent the growth of molds unless the aqueous concentrate is promptly used.

The structures of all of the compounds present in vegetable oil phosphatides have not been definitely established. It is known that vegetable oil phosphatides contain materials classified as lecithin phosphatides and as cephalin phosphatides and it has recently been established that they also contain a considerable amount of materials classified as inositol phosphatides. Commercial phosphatides also contain considerable amounts of non-phosphatidic material, for example, sterol glycosides. The alcohol-soluble fraction of oil-free vegetable oil phosphatides is lower in glycosides and has a lower ash content than either the oil-free phosphatides before they have been fractionated with alcohol or the alcohol-insoluble fraction of the oil-free phosphatides. Also, the alcohol-soluble fraction of the oil-free phosphatides has a relatively low content of the inositol phosphatides present in the phosphatides before extraction with alcohol. That is to say, the alcohol-insoluble fraction contains most of the inositol phosphatides.

Margarin made with the alcohol-insoluble fraction spattered worse than the margarin made with the original phosphatides containing carrier oil or the oil-free phosphatides after acetone extraction. It therefore appears that the alcohol-insoluble fraction of the phosphatides is rich in the components which promote spattering whereas the alcohol-soluble fraction is poor in ingredients which cause spattering.

From the above discussion, it would appear that either the glycosides or the inositol phosphatides or both are the materials which promote spattering. It has been determined that the glycosides do promote spattering since glycosides isolated from the phosphatides and added to margarin produced a margarin which spattered violently and caused the margarin to blacken in the frying pan. Evidence that the inositol phosphatides also promote spattering is found in the fact that the alcohol-soluble fractions of oil-free corn oil phosphatides are somewhat better anti-spattering agents than the alcohol-soluble fraction of oil-free soyabean oil phosphatides. Corn oil phosphatides, in general, contain less inositol phosphatides and also the alcohol-soluble fractions of oil-free corn oil phosphatides also contain less inositol phosphatides than the equivalent alcohol-soluble fraction of soyabean oil phosphatides.

The amount of the oil-free alcohol-soluble phosphatide fraction employed in margarin as an anti-spattering and emulsifying agent will usually range from 0.05% to 0.5%, amounts between 0.1 and 0.3% being ordinarily employed. These percentages are by weight based on the weight of the oil-free alcohol-insoluble phosphatides and the weight of the resulting margarin. Although the oil-free alcohol-soluble phosphatidic fraction of the present invention may be the only emulsifying agent present in the margarin, the present invention does not preclude the presence of small amounts of other non-phosphatidic emulsifying agents such as the mono- and diglycerides or their derivatives mentioned above. Mixtures of alcohol-soluble fractions of various vegetable oil phosphatides may be employed but the margarin should be substantially free from the alcohol-insoluble fractions and the original carrier oils with their associated impurities.

Any conventional or suitable process of manufacturing the margarin may be employed. Margarin manufacture is a highly developed art and the principal steps usually employed are the preparation of a suitable cultured milk, the admixture of this cultured milk with a suitable melted margarin oil along with minor amounts of other materials including salt and an emulsifying agent and the production of a chilled resulting mixture in the form of a semi-solid water-in-oil emulsion. The margarin oil may be any of various mixtures of animal oils or fats and vegetable oils or fats including oleo oils, lard, coconut oil, peanut oil, cottonseed oil, corn oil, etc., some or all of which may be hydrogenated. It may also be a suitable hydrogenated vegetable oil or a mixture of hydrogenated vegetable oils. The essential requirement of a margarin oil is that it be a substantially odorless and tasteless material, have a firm consistency at temperatures between 40 and 60° F., and that it melt in the mouth. These characteristics are well known to margarin manufacturers and form no part of the present invention.

Margarin usually contains at least 80% fat and 15 to 16% water, the remainder being emulsifying agents, milk solids and salt with or without small amounts of flavoring and coloring agents. In this country the milk solids are usually added as part of a culture skim milk although cultured whole milk and reconstituted milk made from dried milk and water may be employed. Unsalted margarin may be produced but commercial margarin usually contains salt. The cultured milk is frequently added in two different portions, one salt-free portion being added before chilling of the fat and the other containing the salt being admixed with the fat after chilling. The emulsifying agent is usually added before the fat is chilled by either adding it to the mixer directly or by first dispersing it in the milk or dissolving it in the fat. The chilling is usually accomplished by spreading upon a chilled roll and scraping the chilled material therefrom. One commonly used chilling apparatus is known as a "Votator" in which a film of chilled material is formed upon the interior of an exteriorly cooled rotating drum and scraped therefrom. The action which takes place is essentially that which occurs in an ordinary ice cream freezer. The margarin is then molded and packaged.

As a specific example of producing a margarin in accordance with the present invention, 360 parts by weight of a melted margarin oil at a temperature of 120° F. was admixed with 81.4 parts by weight of cultured milk at a temperature of 40° F. in an agitator similar to a butter churn. The margarin oil was essentially a hydrogenated cottonseed oil. Approximately 0.72 part by weight of the alcohol-soluble fraction of corn oil phosphatides prepared as above described by first extracting commercial corn oil phosphatides with acetone to remove the carrier oil and then extracting with methyl alcohol to recover an alcohol-soluble fraction, was added to the mixture during the mixing action along with 7.88 parts by weight of sodium chloride. The mixture was then chilled to plastic form in an ice cream freezer and the chilled margarin molded and placed in a refrigerator. The resulting composition on a percentage basis by weight was substantially as follows:

| | Percent |
|---|---|
| Fat | 80.00 |
| Cultured milk | 18.05 |
| Alcohol-soluble oil-free corn oil phosphatides | 0.20 |
| Sodium chloride | 1.75 |

This margarin upon being heated in an open pan to frying temperatures produced no spattering and no separation of solids. It will thus be seen that I have provided an improved anti-spattering margarin as well as an improved anti-spattering agent for incorporation into margarin.

I claim:

1. As a product of manufacture, a margarin comprising, a margarin oil, water, milk solids, and a small amount of the methanol-soluble fraction of oil-free vegetable oil phosphatides as an emulsifying and anti-spattering agent, said margarin being substantially free from methanol-insoluble vegetable oil phosphatides and from the impurities associated with the original carrier oil of said vegetable oil phosphatides.

2. As a product of manufacture, a margarin comprising, a margarin oil, water, milk solids, and an amount of the methanol-soluble fraction of oil-free vegetable oil phosphatides ranging between approximately 0.05% and 5% by weight of the margarin as an emulsifying and anti-spattering agent, said margarin being substantially free from methanol-insoluble vegetable oil phosphatides and from the impurities associated with the original carrier oil of said vegetable oil phosphatides.

3. As a product of manufacture, a margarin comprising, a margarin oil, water, milk solids, and an amount of the methanol-soluble fraction of oil-free corn oil phosphatides ranging between approximately 0.05% and 5% by weight of the margarin as an emulsifying and anti-spattering agent, said margarin being substantially free from methanol-insoluble vegetable oil phosphatides and from the impurities associated with the original carrier oil of said corn oil phosphatides.

4. As a product of manufacture, an anti-spattering and emulsifying agent for margarin, comprising the methanol-soluble fraction of oil-free vegetable oil phosphatides in a carrier of refined glyceride oil, said phosphatides being substantially free from methanol-insoluble vegetable oil phosphatides and from the impurities associated with the original carrier oil of said vegetable oil phosphatides.

5. As a product of manufacture, an anti-spattering and emulsifying agent for margarin, comprising the methanol-soluble fraction of oil-free corn oil phosphatides in a carrier of refined glyceride oil, said phosphatides being substantially free from methanol-insoluble vegetable oil phosphatides and from the impurities associated with the original carrier oil of said corn oil phosphatides.

MORRIS MATTIKOW.

References Cited in the file of this patent

UNITED STATES PATENTS

| Number | Name | Date |
|---|---|---|
| Re. 19,767 | Reynolds | Nov. 26, 1935 |
| 1,055,514 | Buer | Mar. 11, 1913 |
| 1,917,259 | Harris | July 11, 1933 |
| 2,013,804 | Klein et al. | Sept. 10, 1935 |